E. J. DOUGHERTY.
AGRICULTURAL IMPLEMENT.
APPLICATION FILED DEC. 1, 1917.

1,331,808.

Patented Feb. 24, 1920.
2 SHEETS—SHEET 2.

Inventor
Edward J. Dougherty,
By Rippey & Kingsland,
His Attorneys.

Attest.
Charles A. Becker.

UNITED STATES PATENT OFFICE.

EDWARD J. DOUGHERTY, OF ST. LOUIS, MISSOURI.

AGRICULTURAL IMPLEMENT.

1,331,808. Specification of Letters Patent. Patented Feb. 24, 1920.

Application filed December 1, 1917. Serial No. 204,823.

*To all whom it may concern:*

Be it known that I, EDWARD J. DOUGHERTY, a citizen of the United States, residing at the city of St. Louis and State of Missouri, have invented a new and useful Agricultural Implement, of which the following is a specification.

This invention relates to agricultural implements.

It is now recognized that soil requires replenishment or refertilization by supplies of fertilizer containing ozone and other elements, or otherwise revitalized by additional supplies of the necessary quantities of ozone and the like, in order to be maintained at highest efficiency of productivity. It is now known that some of the needed elements can be supplied from the air, and the principal object of the present invention is to provide an agricultural implement for cultivating and vitalizing the soil comprising mechanism for breaking and raising the ground and coöperating mechanism for electrical treatment and injection of the air into the broken soil before the soil settles from the breaking mechanism.

In carrying out my invention, I have provided an apparatus for the electrical treatment of the air by the use and operation of electric mechanism operating in conjunction and coöperative relation with mechanism for forcing currents of dampened or moistened air through an inclosed chamber in which the air is subjected to the action of electric mechanism and forcing or injecting the electrically treated air into the broken or pulverized soil to be absorbed in the soil before the same settles from the ground breaking or tilling mechanism.

In the accompanying drawings, I have illustrated the mechanism for electrical treatment of the air and have also illustrated the said mechanism combined conventionally with a form of ground breaking or tilling apparatus, although it will be clearly understood in this connection that the illustration of the latter mechanism is only conventional and merely for the purpose of making clear one method of using the invention. In said drawings Figure 1 is a view illustrating the invention embodied in a ground breaking or tilling implement.

Figure 2:
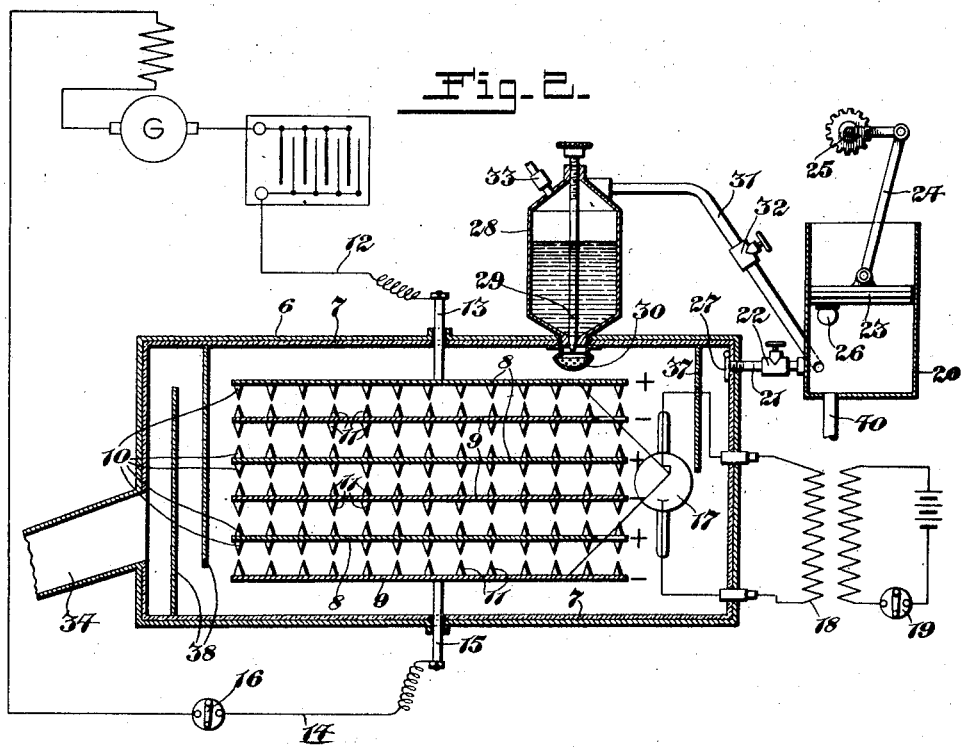

Fig. 2 is a sectional view illustrating the electric mechanism comprising a system of electrically energized positive and negative electrodes between which the air is forced and by the action of which the nitrates, ozone, etc., are transformed preparatory to being forced into the soil.

Figure 1:
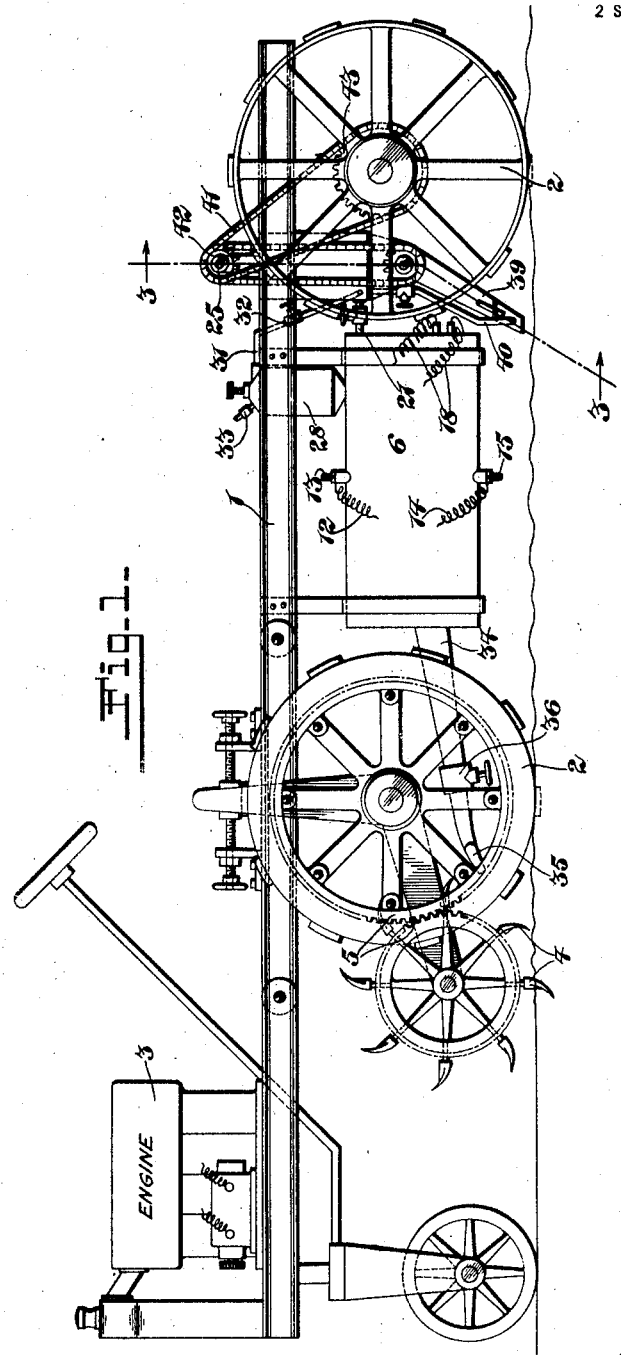

The implement which is only conventionally illustrated in Fig. 1 for the purpose of enabling the present invention to be comprehended, comprises a supporting frame 1 mounted on tractor wheels 2 and propelled by a motor or engine 3. The connections for driving the implement from the motor or engine are omitted from the drawing, since they constitute no part of the present invention, it being deemed sufficient for the present purpose to comprehend that the implement may be propelled by an engine or motor, or drawn by horses as preferred.

In the embodiment illustrated the ground breaking mechanism comprises a revoluble series of plows 4 operated by driving gears 5, or other appropriate driving connections, which operate as an incident to rotation of the tractor wheels. As the implement moves the plows 4 are revolved and break, raise and pulverize the soil, and it is an important feature of the present invention that the air subjected to treatment by the electric mechanism is forced or injected into the broken soil before the soil settles, after being raised by the breaking and pulverizing mechanism. However, the utility and operation of the present invention is not confined to an operation in which the air is forced into the soil or ground in the specific manner stated, for it is readily apparent that said elements may be forced or injected into the soil otherwise than in that specific manner.

For instance, this invention can be coöperatively combined with various types of plowing, harrowing, disking and cultivating implements to treat and inject the air into the ground.

The electric mechanism is confined within a case 6 having a lining 7 (Fig. 2) of insulating material such as glass, or any other substance that will serve the necessary function. Within the case a number of supports 8 are arranged in alternating series with a number of the supports 9. The supports 8 support a plurality of pointed elements 10 and the supports 9 support a series of similar elements 11, of which the elements 10 may be designated anodes and the elements 11 as the cathodes, the same being in circuit with the proper wires respectively of an electric circuit. As shown, the wire 12 from the battery is connected to an element 13 in circuit with the supports 8; and the wire 14 is connected to an element 15 in circuit with the supports 9. The electric mechanism may also include a generator designated by G, and a switch 16 by which the circuit may be opened and closed as desired.

In some instances it may also be desirable to assist the action of the electric mechanism above described by the action of light rays such, for instance, as Roentgen or other stronger luminous light rays, to increase the efficiency of the current; and, for this purpose I provide an electric ray producing mechanism 17 which is conventionally illustrated in Fig. 2, the details thereof being no part of the present invention and not requiring illustration for the reason that such mechanisms are well known in other embodiments and for other purposes. The electric mechanism 17 is properly mounted in an electric circuit 18 energized from a battery controlled by a switch 19 so that the ray producing or illuminating mechanism may be thrown into or out of operation as desired. This enables the remaining electric mechanism to be operated independently of the ray producing or illuminating mechanism.

The air is forced into the case 6 for treatment and discharged therefrom after treatment by means of air compressing pumps. As illustrated there are a plurality of pumps which are operated automatically as the implement travels, so that a continuous supply of air is delivered into the case containing the electric mechanism and discharged therefrom after treatment. As shown, each pump includes a cylinder 20 having a pipe 21 opening into the case 6, each of said pipes being provided with a valve 22. A piston 23 is operatively mounted in each pump cylinder. The pistons 23 are connected by links or pitman rods 24 with a crank shaft 25 which is journaled for rotation in the frame of the implement. Each of the pistons 23 is equipped with a valve 26 of the well known butterfly type which opens as the pistons rise in the cylinders in order to admit air into the cylinders below the pistons; and which close as the pistons descend in order to prevent the escape of the air from the cylinders and to force the air through the pipes 21 into the case 6 for treatment, and from the case 6 into the broken soil after the air has been subjected to treatment by the electric mechanism within the case. In order to prevent withdrawal of the air from the case 6 as the pistons rise in the pump cylinders a butterfly valve 27 (Fig. 2) is provided at the opening of each of the pipes 21. The valves 27 open under the pressure of the air as the pistons descend but assume closed positions as the pistons rise.

It is desirable to maintain the air in the case 6 charged with moisture in which condition the air more readily yields to the action of the electric mechanism. For supplying the desired moisture, I provide a water vessel 28 arranged to discharge water in the case 6 preferably in the form of a fine spray. The bottom of the vessel 28 has a passage opening into the case 6, said passage being controlled by a valve 29 which is adjustable in different positions in order to vary the quantity of water that may pass through the passage. In order to convert the water into a fine spray a cup 30 is arranged to receive the water from the passage from the water vessel, and said cup is provided with small perforations through which the water is forced or injected in the form of a fine spray which is taken up or absorbed by the air in the case. Pressure may be applied to the water in the vessel 28 in order to force the water therefrom and to inject the water in the form of spray into the case 6. The pressure may be supplied to the vessel 28 through a pipe 31 leading from one of the pump cylinders and having a valve 32 by which the pressure may be varied or cut off when desired. To prevent excess pressure in the vessel 28 the same may be equipped with an exhaust or blow off valve 33, the details of which are not illustrated for the reason that the same is well known commercially and constitutes no part of the present invention.

The air from the case 6 is discharged into the soil before the soil settles after dropping from the breaking mechanism. For this purpose a passage 34 leads from the case 6 and is arranged to discharge the air into the falling soil. The arrangement of the passage 34 will be readily understood by reference to Fig. 1 in which it will be seen that said passage has a transverse discharge member 35 at its forward end having a slot therein, so that the air will be discharged into the soil across the entire width of the ground breaking device. The passage 34 is equipped with a valve 36 for varying the amount of the air which may pass; for varying the force or pressure under which the air is injected into the falling soil; and for opening and closing the passage, as desired.

Within the case 6 there are a number of partitions partially closing the case and which serve to deflect the air through a tortuous passage and to retard the movement of the air through the case so that all of the air will be subjected to the treatment or action of the electric mechanism. One of the partitions 37 (Fig. 2) is adjacent to the air inlets from the pipes 21 and two other oppositely disposed partitions 38 are near the opening into the passage 34.

The crank shaft 25 is operated, as shown, by a chain 41 operatively connecting a sprocket wheel 42 on the crank shaft with a sprocket wheel 43 in connection with one of the tractor wheels 2.

It is apparent that the mechanism may be modified in many respects without departure from the spirit of the invention and I do not restrict myself to specific features, but what I claim and desire to secure by Letters Patent, is:—

1. In an agricultural implement, land breaking mechanism, mechanism operated as an incident to movement of the implement for forcing air into the broken land before it settles after being broken, and electric mechanism for treating the air being forced into the ground, whereby the broken land will be subjected to the action of the electrically treated air before the land settles after being broken by the land breaking mechanism.

2. In an agricultural implement, ground breaking mechanism, means for operating the ground breaking mechanism as the implement is moved, mechanism operated as an incident to movement of the implement for forcing air into the broken ground before the ground settles after being broken, and mechanism for subjecting the air which is being forced toward the broken ground to electrical energy, whereby as an incident to movement of the implement, the broken ground will be subjected to the action of the electrically treated air before the ground settles after being broken by the ground breaking mechanism.

3. In an agricultural implement, mechanism for breaking and raising the ground, mechanism for forcing air into the broken ground before the ground settles, means for operating said mechanism as an incident to movement of the implement, means for preventing the forcing of air into the ground as desired, and means for subjecting the air which is being forced from said air forcing mechanism to electrical energy, whereby the treated air will enter into and act upon the broken ground before the ground settles after being broken.

4. An agricultural implement, comprising a power propelled frame, mechanism operated as an incident to movement of the implement for breaking and raising the ground, mechanism operated by the implement for forcing and distributing air into the broken ground before the ground settles after being broken by the breaking mechanism, means for preventing the forcing of air into the ground as desired, means for supplying moisture into the air before the air is forced into the ground, and means for treating the air by electrical energy before the air enters the broken ground.

5. An agricultural implement, comprising a power propelled frame, plow mechanism in said frame for breaking the ground, mechanism for forcing air into the broken ground before the ground settles after being broken, and mechanism for subjecting the air to electrical energy before the air enters the broken ground.

6. An agricultural implement, comprising a movable frame, plow mechanism mounted in said frame for breaking and raising the ground, a case supported by the frame, mechanism for forcing air into the case and from the case into the broken ground before the ground settles after being broken by the plow mechanism, and electric mechanism within the case for subjecting the air being forced therethrough to the action of electrical energy before the air enters the ground.

7. An agricultural implement, comprising a frame, means for moving said frame, plow mechanism mounted in said frame for breaking the ground, a case supported by said frame, mechanism operated as an incident to movement of the frame for forcing air into said case and from the case into the ground before the ground settles after being broken by the plow mechanism, a water tank, and a spray device in connection with said tank for injecting a spray of water into the air in said tank.

8. An agricultural implement, comprising a frame, mechanism in said frame for breaking the ground, a case supported by said frame, mechanism for forcing air into the case and from the case into the ground before the ground settles after being broken, a water tank, a passage from said tank into said case, a spray device in connection with said passage, whereby water may be sprayed into the case, and a passage from said air forcing mechanism to said water tank whereby the water will be forced from said tank through said spray device.

9. An agricultural implement, comprising ground breaking mechanism, a passage for conducting air to the broken ground, means for forcing air through said passage into the broken ground, and electric mechanism in said passage for subjecting the air to electrical energy before the air enters the broken ground.

10. An agricultural implement, comprising ground breaking mechanism, mechanism for forcing air into the broken ground before the ground settles after being broken, means for forcing moisture into the air which is being forced toward the broken ground, and means for subjecting the moist air to the action of electrical energy before the air enters the ground.

In witness whereof I have hereunto signed this specification.

EDWARD J. DOUGHERTY.